(12) United States Patent
Lemckau et al.

(10) Patent No.: US 8,974,623 B2
(45) Date of Patent: Mar. 10, 2015

(54) METHOD AND A PLACEMENT TOOL FOR THE MANUFACTURE OF A NON-CRIMP FABRIC

(75) Inventors: Thomas Lemckau, Buxtehude (DE); Sönke Harders, Stade (DE); Sophie Kerchnawe, Dresden (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/519,331

(22) PCT Filed: Dec. 29, 2010

(86) PCT No.: PCT/EP2010/070827
§ 371 (c)(1),
(2), (4) Date: Jun. 27, 2012

(87) PCT Pub. No.: WO2011/080287
PCT Pub. Date: Jul. 7, 2011

(65) Prior Publication Data
US 2012/0279649 A1 Nov. 8, 2012

Related U.S. Application Data

(60) Provisional application No. 61/290,512, filed on Dec. 29, 2009.

(30) Foreign Application Priority Data

Dec. 29, 2009 (DE) .......................... 10 2009 060 696

(51) Int. Cl.
*B29C 65/00* (2006.01)
*B32B 37/00* (2006.01)
(Continued)

(52) U.S. Cl.
CPC ................. *B29C 70/30* (2013.01); *B29C 33/68* (2013.01); *B29C 37/0067* (2013.01);
(Continued)

(58) Field of Classification Search
CPC .... B29C 65/00; B29C 65/50; B29C 65/7415; B29C 65/7416; B29C 65/78; B29C 65/7802; B29C 65/7808; B29C 65/7841; B29C 65/7844; B29C 65/7847; B29C 65/7858; B29C 65/7864; B29C 65/7876; B29C 65/7888; B29C 65/80; B29C 66/00; B29C 66/001; B29C 66/00145; B29C 66/0044; B29C 66/005; B29C 66/712; B29C 66/721; B29C 66/72
USPC .......... 156/285, 286, 382; 264/511, 553, 566, 264/568, 571; 425/504, 388, 405.1, 405.2
See application file for complete search history.

(56) References Cited

U.S. PATENT DOCUMENTS 5,127,601 A * 7/1992 Schroeder ..................... 244/1 A
5,290,386 A * 3/1994 Trudeau ........................ 156/350
(Continued)

FOREIGN PATENT DOCUMENTS

EP 0062991 * 10/1982
FR 2905891 A1 3/2008
(Continued)

OTHER PUBLICATIONS

International Preliminary Report on Patentability issued on Jul. 19, 2012 in corresponding application No. PCT/EP2010/070827.
(Continued)

*Primary Examiner* — Richard Crispino
*Assistant Examiner* — Matthew Hoover
(74) *Attorney, Agent, or Firm* — Carter DeLuca Farrell & Schmidt LLP

(57) ABSTRACT

Disclosed is a method for placing fiber-reinforced, pre-impregnated, planar semi-finished products on a placement tool for the manufacture of a non-crimp fabric, wherein a placement film is clamped on the placement tool for purposes of holding the non-crimp fabric, and by means of evacuation and/or the application of pressure is fixed in position on the placement tool and/or can be released from the latter. Also disclosed is a placement tool for the execution of such a method.

5 Claims, 3 Drawing Sheets

(51) Int. Cl.
*B29C 45/00* (2006.01)
*B29C 47/00* (2006.01)
*B29C 43/02* (2006.01)
*B29C 49/00* (2006.01)
*B29C 51/00* (2006.01)
*B29D 24/00* (2006.01)
*B29D 29/00* (2006.01)
*B29B 15/00* (2006.01)
*B29C 39/14* (2006.01)
*B29C 49/08* (2006.01)
*B29C 55/00* (2006.01)
*B29C 67/20* (2006.01)
*B29D 7/00* (2006.01)
*B29C 43/10* (2006.01)
*A01J 21/00* (2006.01)
*A01J 25/12* (2006.01)
*A21C 3/00* (2006.01)
*A21C 11/00* (2006.01)
*A23G 1/20* (2006.01)
*A23G 3/02* (2006.01)
*A23P 1/00* (2006.01)
*B28B 11/08* (2006.01)
*B28B 21/36* (2006.01)
*B29C 55/28* (2006.01)
*B29C 70/30* (2006.01)
*B29C 33/68* (2006.01)
*B29C 37/00* (2006.01)
*B29C 70/44* (2006.01)
*B29C 70/54* (2006.01)
*B29L 31/30* (2006.01)

(52) U.S. Cl.
CPC .............. *B29C 70/44* (2013.01); *B29C 70/541* (2013.01); *B29L 2031/3082* (2013.01)
USPC ........... 156/285; 156/286; 156/382; 264/511; 264/553; 264/566; 264/568; 264/571; 425/388; 425/405.1; 425/405.2; 425/504

(56) References Cited

U.S. PATENT DOCUMENTS 8,252,134 B2   8/2012  Soccard
8,329,085 B2 *  12/2012  Kurtz et al. .................... 264/258
2005/0253309 A1 *  11/2005  Hou et al. ...................... 264/571

FOREIGN PATENT DOCUMENTS

FR          2912077 A1       8/2008
WO     WO2008031866    *    3/2008
WO     WO 2009/130493 A1    10/2009

OTHER PUBLICATIONS

International Search Report for Appln. No. PCT/EP2010/070827 mailed May 23, 2011.

* cited by examiner

METHOD AND A PLACEMENT TOOL FOR THE MANUFACTURE OF A NON-CRIMP FABRIC

TECHNICAL FIELD

The present invention concerns a method for placing fibre-reinforced pre-impregnated planar semi-finished products on a placement tool for the manufacture of a fibre a non-crimp fabric (fibre mat), and also a placement tool for the execution of such a method.

BACKGROUND OF RELATED ART

Methods for placing prepregs, i.e. fibre-reinforced pre-impregnated planar semi-finished products on a placement tool for the manufacture of a fibre mat are generally known as "automated fibre placement" (AFP) or "automated tape placement" (ATP) methods. Here semi-finished products, which have fibres that are pre-impregnated with a thermosetting or thermoplastic material, for example, carbon fibres that are oriented relative to one another, are laid down on a tool that is a close match to the final contour. The significant difference between the AFP and the ATP process consists in the fact that in the ATP process narrow material tapes, i.e. semi-finished product tapes, are laid down, whereas in the AFP process wide webs of material are used, with the result that the AFP method is particularly suitable for the reproduction of three-dimensional structures. The tool usually has a horizontal or a vertically oriented surface for purposes of holding the material to be laid down. In order to be able to position the material on the vertically oriented tool conventionally a fluid adhesion promoter is applied onto the tool surface. The adhesion promoter enables both a sufficient retention of the material, i.e. fibre mat, on the tool surface and also a simple release of the fibre mat from the surface. However, disadvantages relating to the adhesion promoter include both its labour-intensive application onto the tool surface, and also the time-intensive cleaning of the tool surface after the fibre mat has been released, with the result that the placement performance is markedly reduced. In principle it is also possible to position the material on the tool surface without a fluid adhesion promoter, but the fibre mat can then only be separated from the tool surface with great difficulty. Furthermore the adhesion promoter can be responsible for risks to health and environmental pollution, so that appropriate safety and environmental regulations must be observed.

SUMMARY

The object of the present invention is to create a method for placing fibre-reinforced pre-impregnated planar semi-finished products on the placement tool for the manufacture of a fibre mat, which removes the above-cited disadvantages and has a higher placement performance and also has no effects, or greatly reduced effects, on health or the environment, and also to create a placement tool for such a method.

This object is achieved by means of a method with the features of Claim 1.

In an inventive method for placing fibre reinforced pre-impregnated planar semi-finished products on a placement tool for the manufacture of a fibre mat a placement film is firstly fixed on the placement tool for purposes of holding the semi-finished products by means of the application of a vacuum. The semi-finished products are then laid down by layers on the placement film as skin plies. After the build-up of the mat, i.e. laminate, the latter is transferred onto a subsequent production means by pivoting the placement tool and subsequently releasing the vacuum. The placement film is then removed from the first skin ply and the subsequent treatment of the mat can begin. In the inventive solution it is particularly advantageous that the fixing of the semi-finished products on the placement tool takes place without a fluid adhesion promoter, but rather by means of a placement film that is simple to apply and remove. This enables on the one hand an increased placement performance, since on the one hand the application of the adhesion promoter and the cleaning of the placement tool are omitted, and there is also a significant reduction or complete elimination of any risks to health and the environment. In particular the speed of placement of the first skin ply is significantly increased. The placement film serves, so to speak, as surface protection for the tool surface and together with a sufficient retention of the fibre mat, i.e. its first skin ply, at the same time, by virtue of the standard impregnation of the semi-finished products on the film, allows a simple and rapid release from both the tool surface and also the first skin ply for purposes of transfer, or after transfer, for example, of the fibre mat to a downstream work station.

In one preferred example of embodiment the skin plies are compacted by means of an intermediate level of vacuum, so that it can be ensured that no cavities form between the individual skin plies. The compaction, i.e. the generation of the intermediate level of vacuum, can be undertaken by the covering of the skin plies with a film, which is sealed relative to the external environment, and thus forms a chamber in which the skin plies are arranged and which can be evacuated by the application of a vacuum.

In addition to the placement of pre-impregnated planar semi-finished products other types of materials or components, such as, for example, lightning protection in the form of a planar copper mesh, can likewise be laid down and with the previously laid down skin plies can be compacted via an intermediate level of vacuum.

The positioning of the placement film on the placement tool takes place in one example of embodiment in that this is firstly clamped onto the placement tool in the diagonal direction. It is then clamped in the region of its diametrically opposite sides and checked for the formation of creases or bubbles. After the removal of any creases or bubbles the placement film is sealed relative to the external environment around its periphery by, for example, a peripheral adhesive tape on the placement tool. Another type of sealing provides for a pressure frame, by means of which the film can be brought into contact with the tool surface in the vicinity of its edges.

An inventive placement tool for placing fibre-reinforced planar semi-finished products so as to form a fibre mat has a multiplicity of holes introduced into its tool surface, which can be connected in fluid terms with an evacuation device. The multiplicity of holes allows even and extensive retention that is free of creases and bubbles of a fabric laid down on the tool surface, such as, for example, a placement film for purposes of holding the semi-finished products.

In one example of embodiment the holes are subdivided into hole arrays that can be activated separately from one another. In this manner it is possible firstly to fix the placement film securely on the tool surface by means of the removal of air by suction, and then to compact the skin plies laid down on the placement film by means of at least an intermediate level of vacuum, without this having a negative effect on the fixing of the placement film.

Other advantageous examples of embodiment of the present invention are the subject of further dependent claims.

BRIEF DESCRIPTION OF THE DRAWINGS

In what follows a preferred example of embodiment of the invention is elucidated in more detail with the aid of schematic representations. Here.

DETAILED DESCRIPTION

In what follows the same design elements bear the same reference numbers, wherein in the event of a plurality of the same design elements in one figure, only some of the elements are provided with a reference number, in the interests of clarity.

Figure 1:
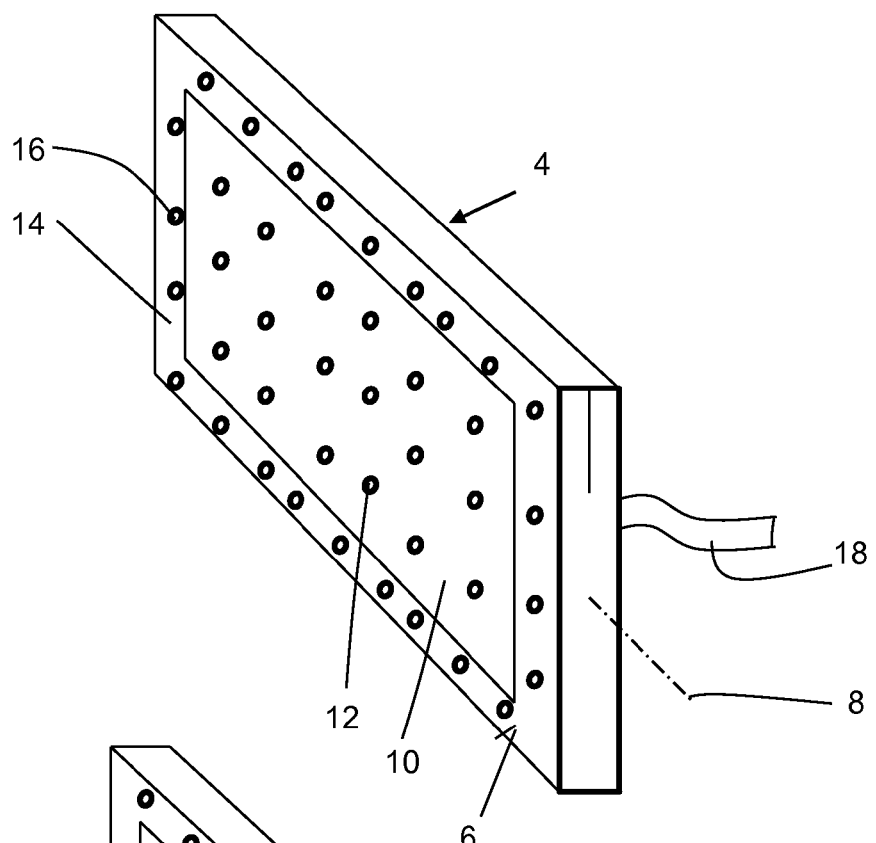
FIG. 1 shows a perspective representation of an inventive placement tool.
Figure 7:
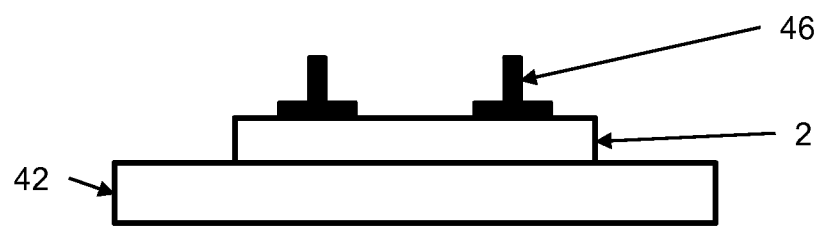

FIG. 1 shows an inventive placement tool 1 for the manufacture of a fibre mat or laminate 2 (see FIG. 7). The fibre mat 2 forms, for example, the skin of an approximately 16 m long shell element of an aircraft fuselage, which is composed of four shell elements, which are connected with one another on their longitudinal sides.

The placement tool 1 has an approximately rectangular body 4 with a vertically orientated tool surface 6, and can be pivoted about its longitudinal axis 8. The tool surface 6 is designed as a close match to the contour of the inner circumference of the aircraft fuselage and is appropriately curved in a concave manner (not shown) along the longitudinal axis 8. It has an inner hole array 10 with a multiplicity of holes 12, and an outer hole array 14 with a multiplicity of holes 16, which encompasses the inner hole array 10 in the form of a frame. The holes 12, 16 are connected in fluid terms via a line 18 in the form of a pipe or hose with an evacuation device (not represented), by means of which air can be sucked or blown from the tool surface 6 through the holes 12, 16.

Figure 2:
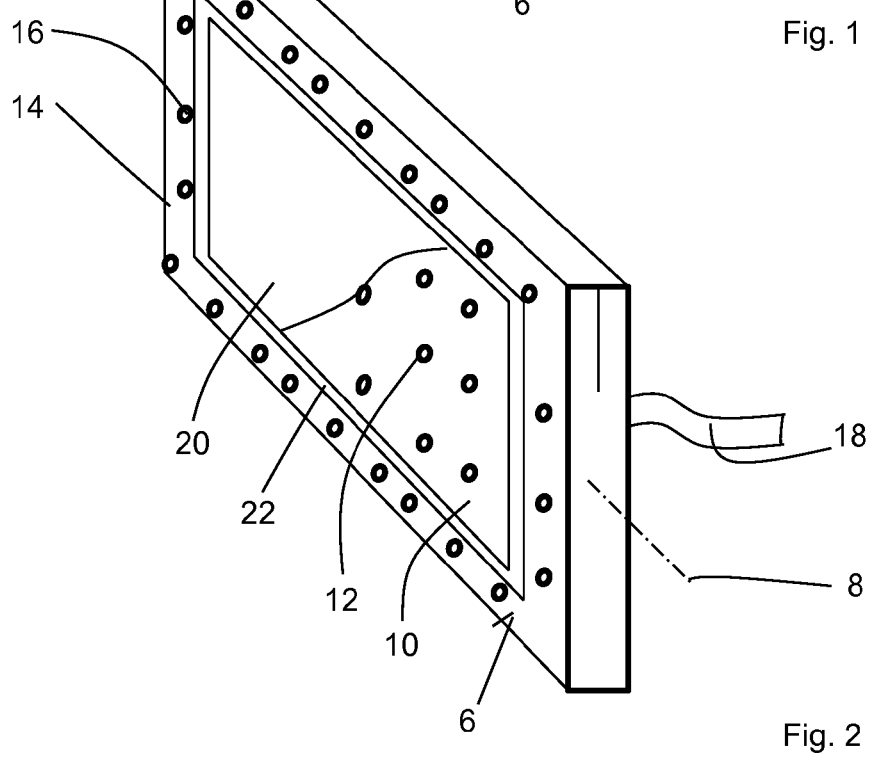
FIG. 2 shows a placement tool from FIG. 1 with a placement film in position.

For the manufacture of the fibre mat 2, a placement film 20 is firstly positioned on the tool surface 6 over the first hole array 10, as shown in FIG. 2, and by means of a peripheral adhesive tape 22 is sealed onto the tool surface 6 relative to the external environment. The placement film 20 consists preferably of a thermoplastic plastic, for example, polyethylene terephthalate (PET). Examples of placement films 20 include Platilon 4100 AK from the company Epurex, MF PATS W230 and MF PATS W230 Corona from the company MF Folien, HS 8171 from the company Richmond, and Securlon L2000 from the company Airtech. The placement film 20 has a surface finish such that it allows a sufficient retention of the fibre mat 2 without the use of additional fluid adhesion promoters, and at the same time allows a simple release of the fibre mat 2.

Figure 3:
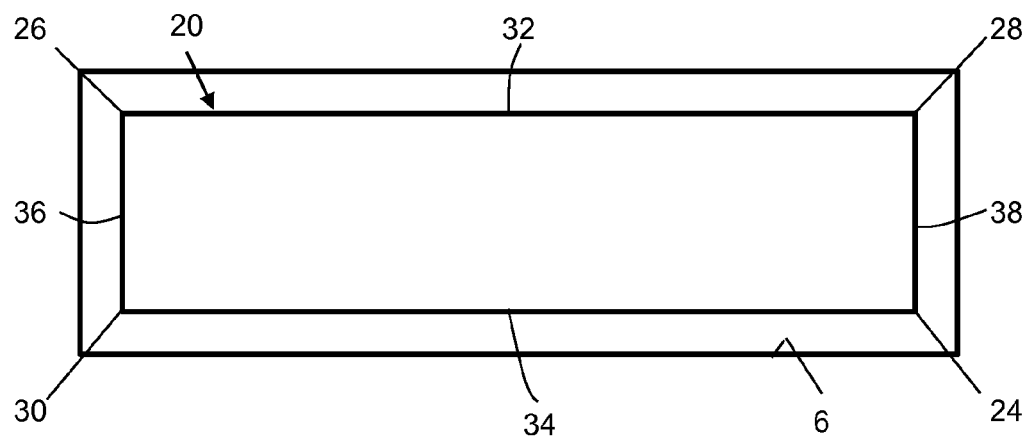
FIG. 3 shows steps in the method for positioning the placement film on the placement tool.

In accordance with the representation in FIG. 3 the placement film 20 is firstly clamped onto the tool surface 6 at its opposing corners 24, 26 and 28, 30. It is then clamped on its diametrically opposed longitudinal sides 32, 34 and subsequently on its diametrically opposed narrow sides 36, 38 until it lies flat on the tool surface 6 and all, or nearly all, creases, kinks or bubbles in it, or under it, have been eliminated. As soon as the placement film 20 is adequately clamped on the tool surface 6, it is fixed to the tool surface 6 by means of the adhesive tape 22. The evacuation device is now activated such that the air between the placement film 20 and the tool surface 6 is extensively and evenly sucked out via the holes 12 of the inner hole array 10, thus ensuring that no creases, kinks, bubbles or similar are formed in any region of the placement film 20. The level of vacuum to be applied is essentially governed by the type of material and the thickness of the placement film 20.

Figure 4:
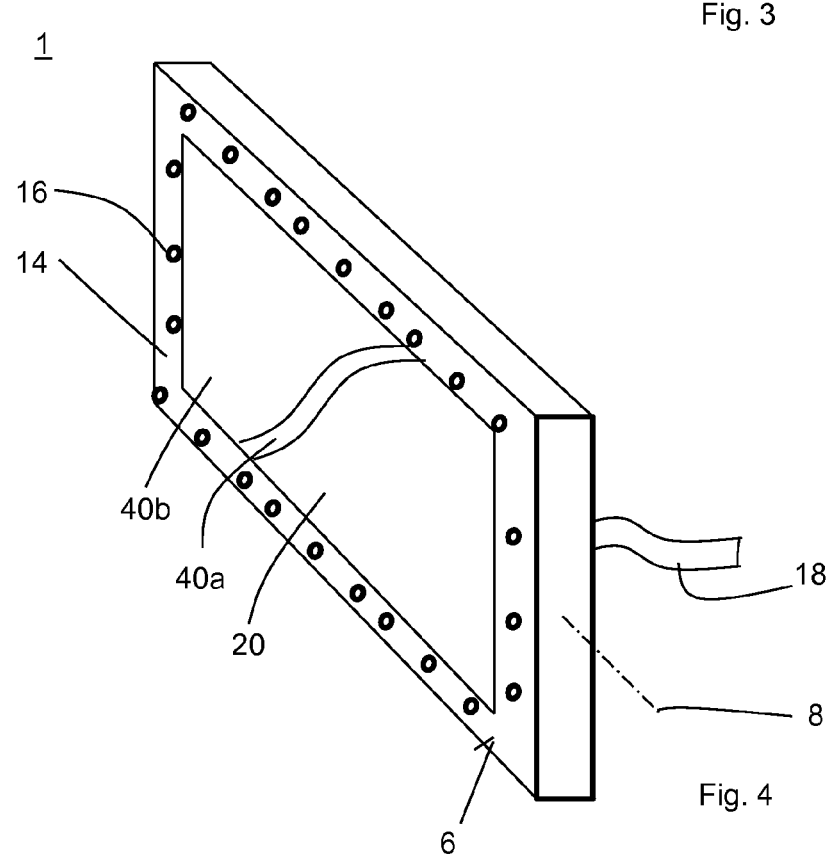
FIG. 4 shows the placement of skin plies on the placement film.

After the placement film 20 has been fixed free of kinks and bubbles, skin plies 40a, 40b are laid down in accordance with the AFP method, as shown in FIG. 4, by the placement of textile pre-impregnated semi-finished products, so-called prepregs, which are mounted on appropriate pre-wound spools, so as to form the fibre mat 2 on the placement film 20 by layers. After the formation, or layering, of a multiplicity of skin plies 40a, 40b, these can be compacted by means of an intermediate level of vacuum. This takes place in that a film (not shown) is placed over the last formed skin ply 40a; the film spans across the outer hole array 14 and is attached in a sealed manner to the tool surface 6, for example, by means of a peripheral adhesive tape. The outer hole array 14 is then activated via the evacuation device, so that the air between the film and the uppermost skin ply 40b is sucked out via the holes 16. After compaction the intermediate level of vacuum is released by switching over the evacuation device such that air can now flow out via the holes 16 into the edge region of the tool surface. The film is then removed and further skin plies 40 and/or other fabrics, such as, for example, a lightning protection mesh, are laid down on the uppermost skin ply 40b, until the fibre mat (non-crimp fabric) 2 has the predetermined number of skin plies and material thickness.

Figure 5:
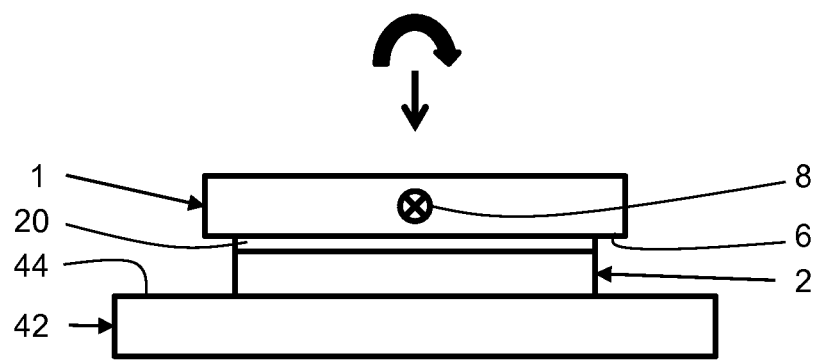
FIGS. 5 to 7 show the transfer of the skin plies to a curing device.

After the placement of all skin plies 40 the fibre mat 2, as shown in FIG. 5, is transferred to a curing device 42 for further treatment. For this purpose it is pivoted about its longitudinal axis 8 until the tool surface 6 is arranged horizontally with the fibre mat 2 facing downward above a horizontal or appropriately convex surface 44 of the curing device 42. The first hole array 10 is then activated such that air is blown out via the holes 12, i.e. can flow in, and thus the vacuum between the tool surface 6 and the placement film 20 is released. The adhesive tape 22 is removed and the tool surface 6 is freed from the fibre mat 2.

Figure 6:
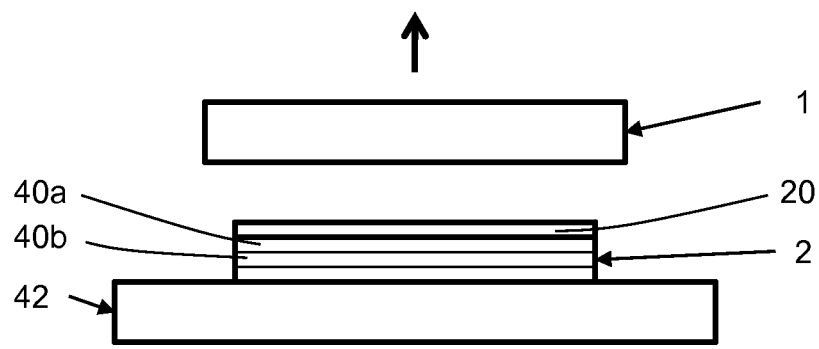

After the release of the vacuum, and the transfer of the fibre mat 2 to the curing device 42, the placement tool 1 is traversed backwards, as shown in FIG. 6, and the build-up of a new fibre mat can begin. The placement film 20 is removed from the first skin ply laid down 40a of the fibre mat 2 positioned in the curing device 42, so that now, as shown in FIG. 7, subsequent treatment steps such as, for example, the attachment of longitudinal stiffeners 46 to form a stiffening backing structure for the fibre mat 2 can be undertaken.

Disclosed is a method for placing fibre-reinforced, pre-impregnated, planar semi-finished products on a placement tool 1 for the manufacture of a non-crimp fabric 2, wherein a placement film 20 is clamped on the placement tool 1 for purposes of holding the non-crimp fabric 2, and by means of evacuation and/or the application of pressure is fixed in position on the placement tool and/or can be released from the latter; also disclosed is a placement tool 1 for the execution of such a method.

REFERENCE SYMBOL LIST

1 Placement tool
2 Fibre mat/laminate/non-crimp fabric
4 Body
6 Tool surface
8 Longitudinal axis 10 First hole array
12 Hole
14 Second hole array
16 Hole
18 Line
20 Placement film
22 Adhesive tape
24 Corner
26 Corner
28 Corner
30 Corner
32 Longitudinal side
34 Longitudinal side
36 Narrow side
38 Narrow side
40 Skin ply
42 Curing device
44 Surface
46 Longitudinal stiffener

The invention claimed is:

1. A method for placing fibre-reinforced pre-impregnated planar semi-finished products on a placement tool for the manufacture of a fibre mat, the method comprising:
  applying a placement film for holding the fibre-reinforced pre-impregnated planar semi-finished products on the placement tool,
  fixing the placement film by the application of a vacuum,
  placing the fibre-reinforced pre-impregnated planar semi-finished products in layers on the placement film to form skin plies and building up the fibre mat,
  transferring the built-up fibre mat onto a production means downstream by pivoting the placement tool and subsequent release of the vacuum, and
  removing the placement film from a first skin ply,
  wherein the skin plies are compacted via application of at least one intermediate level of vacuum and the application of the vacuum for fixing the placement film and for compacting the plies occurs via hole arrays that are activated separately from one another by a single evacuation device.

2. The method in accordance with claim 1, wherein the skin plies are covered by a film, which forms a chamber that is sealed relative to an external environment, and which is evacuated by the application of the at least one intermediate level of vacuum.

3. The method in accordance with claim 1, wherein lightning protection is laid down on the skin plies.

4. The method in accordance with claim 3, wherein the lightning protection is compacted with the previously laid down skin plies via the at least one intermediate level of vacuum.

5. The method in accordance with claim 1, wherein the applying step includes:
  clamping the placement film in a diagonal direction by its corners;
  clamping the placement film on diametrically opposing sides; and
  sealing the placement film around a periphery of the placement film relative to an external environment.

* * * * *